US010384215B2

(12) United States Patent
Melling

(10) Patent No.: US 10,384,215 B2
(45) Date of Patent: Aug. 20, 2019

(54) CENTRIFUGAL SEPARATOR FOR REMOVING IMPURITIES FROM A FLUID STREAM

(71) Applicant: GM INNOVATIONS LIMITED, Glasgow (GB)

(72) Inventor: Gerard Melling, Glasgow (GB)

(73) Assignee: GM INNOVATIONS LIMITED, Glasgow (GB)

( * ) Notice: Subject to any disclaimer, the term of this patent is extended or adjusted under 35 U.S.C. 154(b) by 303 days.

(21) Appl. No.: 15/101,130

(22) PCT Filed: Dec. 2, 2014

(86) PCT No.: PCT/EP2014/076314
§ 371 (c)(1),
(2) Date: Jun. 2, 2016

(87) PCT Pub. No.: WO2015/082502
PCT Pub. Date: Jun. 11, 2015

(65) Prior Publication Data
US 2016/0318041 A1 Nov. 3, 2016

(30) Foreign Application Priority Data
Dec. 2, 2013 (GB) .................... 1321250.1

(51) Int. Cl.
*B04B 1/00* (2006.01)
*B04B 5/00* (2006.01)
(Continued)

(52) U.S. Cl.
CPC .................. *B04B 5/10* (2013.01); *B04B 1/00* (2013.01); *B04B 5/005* (2013.01); *B04B 7/02* (2013.01);
(Continued)

(58) Field of Classification Search
CPC ........... B04B 5/10; B04B 11/02; B04B 11/06; B04B 1/00; B04B 9/06; B04B 7/04;
(Continued)

(56) References Cited

U.S. PATENT DOCUMENTS 1,640,707 A 8/1927 Laughlin
2,532,792 A 12/1950 Svensjö
(Continued)

FOREIGN PATENT DOCUMENTS

CH 655017 A5 3/1986
CN 203990941 U 12/2014
(Continued)

OTHER PUBLICATIONS

International Search Report for PCT/EP2014/076314 dated May 8, 2015.
UKIPO Search Report for GB1321250.1 dated Apr. 17, 2014.

*Primary Examiner* — Charles Cooley
(74) *Attorney, Agent, or Firm* — Heslin Rothenberg Farley & Mesiti P.C.

(57) ABSTRACT

An apparatus for removing impurities from a fluid stream includes a support structure, a separator unit rotatably mounted on the support structure, and a motor and/or an array of vanes for rotating the separator unit on the support structure. The separator unit has a longitudinal axis of rotation extending through a longitudinal tube disposed centrally within the separator unit. The longitudinal tube is connected or connectable to a pressurized source of fluid requiring separation, the longitudinal tube having one or more openings for receiving fluid under pressure from the said source and one or more lateral openings for introducing the fluid into the separator unit.

18 Claims, 15 Drawing Sheets

(51) Int. Cl.
*B04B 5/10* (2006.01)
*B04B 7/02* (2006.01)
*B04B 9/06* (2006.01)
*C02F 1/00* (2006.01)
*C02F 1/38* (2006.01)
*C02F 1/44* (2006.01)
*C02F 9/00* (2006.01)
*B04B 11/02* (2006.01)
*B04B 11/06* (2006.01)
*C02F 101/12* (2006.01)
*C02F 101/32* (2006.01)
*C02F 103/08* (2006.01)

(52) U.S. Cl.
CPC ............... *B04B 9/06* (2013.01); *B04B 11/02* (2013.01); *B04B 11/06* (2013.01); *C02F 1/001* (2013.01); *C02F 1/38* (2013.01); *C02F 1/385* (2013.01); *C02F 1/441* (2013.01); *C02F 9/00* (2013.01); *C02F 1/444* (2013.01); *C02F 2101/12* (2013.01); *C02F 2101/32* (2013.01); *C02F 2103/08* (2013.01); *Y02W 10/37* (2015.05)

(58) Field of Classification Search
CPC .. B04B 5/005; B04B 3/00; B04B 7/02; B04B 9/10; B04B 11/04; C02F 1/441; C02F 1/001; C02F 9/00; C02F 1/38; C02F 1/385; C02F 2101/12; C02F 2101/32; C02F 2103/08; C02F 1/444; Y02W 10/37
USPC ..................................................... 494/49, 60
See application file for complete search history.

(56) References Cited

U.S. PATENT DOCUMENTS

| | | |
|---|---|---|
| 3,879,286 A | 4/1975 | Berriman |
| 4,589,865 A | 5/1986 | Gullers |
| 4,898,571 A | 2/1990 | Epper et al. |
| 5,062,955 A | 11/1991 | Sciamanna |
| 5,707,519 A | 1/1998 | Miller et al. |
| 2003/0006188 A1 | 1/2003 | Constantine et al. |
| 2006/0089247 A1 | 4/2006 | Ostkamp |
| 2009/0131236 A1* | 5/2009 | Bech .................. B01D 17/0217 494/5 |
| 2016/0074880 A1 | 3/2016 | Thorwid et al. |
| 2016/0318041 A1* | 11/2016 | Melling .................. C02F 1/001 |

FOREIGN PATENT DOCUMENTS

| | | |
|---|---|---|
| DE | 155981 C | 11/1904 |
| EP | 2868210 A1 | 6/2015 |
| FR | 2556241 A1 | 6/1985 |
| GB | 1440592 A | 5/1973 |
| GB | 1328683 | 8/1973 |
| JP | H0368407 A | 3/1991 |
| WO | 9704874 A1 | 2/1997 |
| WO | 03/074185 A1 | 9/2003 |
| WO | 2011028122 A1 | 3/2011 |
| WO | 2014/009161 A2 | 1/2014 |
| WO | 2015/082502 A1 | 6/2015 |
| WO | 2015122919 A1 | 8/2015 |

\* cited by examiner

CENTRIFUGAL SEPARATOR FOR REMOVING IMPURITIES FROM A FLUID STREAM

CROSS REFERENCE TO RELATED APPLICATIONS

This application is a national stage filing under section 371 of International Application No. PCT/EP2014/076314, filed on Dec. 2, 2014, and published in English on Jun. 11, 2015 as WO 2015/082502, and claims priority to British Application No. 1321250.1 filed on Dec. 2, 2013. The entire disclosures of each of the prior applications are hereby incorporated herein by reference.

This invention relates to an apparatus for removing impurities from a fluid stream, for example a stream of liquid such as water.

BACKGROUND OF THE INVENTION

There is a need for an apparatus for separating suspended materials from a fluid stream that is robust, of simple construction, has a high throughput, and is readily portable. Such an apparatus is particularly desirable for providing clean water in field situations and, in particular, disaster relief situations, or for separating oil from water in oil spillage situations, or in removing particulate materials from the liquids produced by fracking.

SUMMARY OF THE INVENTION

The apparatus of the present invention makes use of centrifugal separation for separating suspended materials from a fluid.

Accordingly, in a first aspect, the invention provides an apparatus for separating materials suspended in a fluid stream; the apparatus comprising:
 a support structure;
 a separator unit rotatably mounted on the support structure;
 means for rotating the separator unit on the support structure;
 the separator unit having a longitudinal axis of rotation extending through a longitudinal tube disposed centrally within the separator unit; the longitudinal tube being connected or connectable to a pressurised source of fluid requiring separation; the longitudinal tube having one or more openings for receiving fluid under pressure from the said source and one or more lateral openings for introducing the fluid into the separator unit; wherein the separator unit comprises, in addition to the longitudinal tube:
 (aa) a centrifugal separation chamber for separating suspended material from the fluid stream; and
 (bb) a collector for collecting either (i) suspended material separated from the fluid stream; or (ii) fluid from which at least some of the suspended material has been removed.

The separator unit typically comprises a first chamber and a second chamber in fluid communication with each other, the first chamber being upstream of the second chamber and functioning as the centrifugal separation chamber.

The first and second chambers can be in fluid communication with each other by virtue of openings in a common wall between the two chambers.

Typically, the separator is provided with first and second outlets through which separated components of the fluid stream can pass. Thus, suspended material separated from the fluid stream can pass out through one outlet and the fluid stream from which suspended material has been removed can pass out through the other outlet.

In one general embodiment, the centrifugal separation chamber is in fluid communication with the first outlet and the second chamber is in communication with and upstream of the second outlet.

The collector can be associated with either the first outlet or the second outlet.

In one embodiment, the collector is associated with the first outlet, the first outlet being an outlet from the centrifugal separation chamber.

In another embodiment, the collector is associated with the second outlet, the second outlet being downstream of the second chamber.

In a further embodiment, the first and second outlets each have their own associated collector.

The or each collector is typically static, i.e. it is non-rotatably attached to the support structure and does not rotate with the separator.

In one particular embodiment, a collector is disposed radially outwardly of the separator and is associated with the centrifugal separation chamber.

The centrifugal separation chamber is preferably provided with at least one baffle located adjacent the lateral openings in the longitudinal tube to guide the fluid stream in a radially outward direction.

Where the first and second chambers are in fluid communication with each other by virtue of openings in a common wall between the two chambers, the baffle(s) is disposed in-line between the lateral openings in the longitudinal tube and the said openings in the common wall so as to prevent fluid from passing directly into the second chamber.

The baffle can take the form of a wall extending radially outwardly from the longitudinal tube, the wall serving to divide the centrifugal separation chamber into upstream and downstream sub-chambers, a gap between the radially outer edge of the wall and an opposing surface of the centrifugal separation chamber permitting the fluid stream to flow between the upstream and downstream sub-chambers.

The separator can comprise a drum arranged about (i.e. encircling) the longitudinal tube, the drum having a pair of end walls and a cylindrical outer wall, and one or more inner walls that divide the interior of the drum into first and second chambers and optionally one or more further chambers.

The one or more inner walls can be axially extending walls or radially extending walls or a combination of axially extending and radially extending walls.

In one embodiment, a radially extending inner wall is provided which separates the first and second chambers. The radially extending wall can be fixed, or it can be movable backwards and forwards in an axial direction.

Means are provided for rotating the separator unit on the support structure. The means for rotating the separator unit on the support structure can comprise a motor (e.g. an electric motor) and an appropriate mechanical linkage between the motor and the separator unit. The mechanical linkage can be, for example, a drive belt.

Instead of, or in addition to, a motor, the fluid stream itself can be used to drive rotation of the separator. For example, the separator may be provided with an array of vanes or nozzles and means for directing the fluid stream or a fluid output from the separator over the vanes or through the nozzles to form a turbine which drives rotation of the separator.

In one embodiment, a fluid output from which suspended matter has been removed by the separator is used to power the turbine.

The vanes may be disposed within a collector device so that purified or partially purified fluid passing through the collector is used to power the turbine.

In an alternative embodiment, the flow of fluid through the separator can be split so that a proportion is used to power the turbine and the remainder is collected by a collector.

The separator is typically configured to enable it to carry out a particular type of separation.

In one embodiment, the separator can be configured to separate a fluid from suspended material having a lesser density than the fluid. For example, the separator can be configured to separate oil and water in an oil-water mixture.

When the separator is configured to separate a fluid from suspended material having a lesser density than the fluid, the collector may be arranged to collect separated fluid from the centrifugal separation chamber, via the first outlet. In this embodiment, vanes may be arranged within the collector so as to form a turbine powered by the separated fluid.

In another embodiment, the separator can be configured to separate a fluid from suspended material having a greater density than the fluid. For example, the separator can be configured to remove particulate matter (e.g. sediment and suspended solids) from a fluid such as water.

In this embodiment, the centrifugal separation chamber may remove particles of one size range, and the second chamber may contain one or more filtering elements that remove smaller particles and/or other impurities that may be present in the fluid stream.

For example, the separator can comprise:

(a) a centrifugal separation chamber for separating suspended particulate matter of a first size range from the fluid stream;

(b-i) an array of secondary filters downstream of the centrifugal separation chamber for removing impurities of a predetermined type from the fluid stream;

(c) a flow splitting chamber for diverting a proportion of the fluid to a plurality of nozzles, the nozzles being oriented at an angle with respect to the longitudinal axis such that a pressure of fluid ejected through the nozzles provides a driving force to rotate the filtration unit; and (d) a collector for collecting purified fluid from the filtration unit.

Accordingly, in one embodiment, the invention provides an apparatus for removing impurities from a fluid stream; the apparatus comprising a filtration unit rotatably mounted on a support structure, the filtration unit having a longitudinal axis of rotation extending through a longitudinal tube disposed centrally within the filtration unit; the longitudinal tube being connected or connectable to a pressurised source of fluid requiring purification; the longitudinal tube having one or more openings for receiving fluid under pressure from the said source and one or more lateral openings for introducing the fluid into the filtration unit; wherein the filtration unit comprises, in addition to the longitudinal tube:

(a) a centrifugal separation chamber for separating suspended particulate matter of a first size range from the fluid stream;

(b-i) an array of secondary filters downstream of the centrifugal separation chamber for removing impurities of a predetermined type from the fluid stream;

(c) a flow splitting chamber for diverting a proportion of the fluid to a plurality of nozzles, the nozzles being oriented at an angle with respect to the longitudinal axis such that a pressure of fluid ejected through the nozzles provides a driving force to rotate the filtration unit; and (d) a collector for collecting purified fluid from the filtration unit.

Thus, in this embodiment, the apparatus can be used for removing coarse particulate materials from a fluid (e.g. liquid) stream and one or more further filtering stages for removing finer particulate materials and other contaminants. The filtering stages are contained within a filtration unit which is rotatably mounted on a supporting structure. The primary motive power driving the rotation of the filtration unit, thereby creating the centrifugal force necessary for the centrifugal separator, is the pressure of the fluid to be purified. According to the invention, the flow of liquid through the apparatus is split so that part of the fluid passes through the various filtering devices making up the apparatus, and part of the fluid is ejected through an array of angled nozzles that produce jets of fluid to drive rotation of the filtration unit The filtration unit preferably also comprises (b-ii) an array of tertiary filters downstream of the secondary filters for removing impurities not removed by the centrifugal separation chamber and secondary filters.

The fluid may be a liquid or a gas but, in one particular embodiment, the fluid is a liquid.

The primary means of filtering suspended particulate materials from the fluid is the centrifugal separation chamber. Fluid passing into the filtration unit via the centrally disposed longitudinal tube is initially directed into the centrifugal separation chamber. By virtue of the centrifugal force arising from rotation of the filtration unit, particulate materials of a particular size range will move radially outwardly and into contact with the outer wall of the centrifugal separation chamber where they will typically aggregate to form a deposit (e.g. a sludge in the case of particles entrained in a liquid) that can subsequently be removed mechanically or by flushing. The size of the particles removed from the fluid stream in the centrifugal separation chamber will depend on the speed of rotation of the filtration unit and hence the size of the centrifugal force generated.

The centrifugal separation chamber may contain one or more baffles to direct the fluid to the outer regions of the chamber and facilitate centrifugal separation.

Partially purified fluid from the centrifugal separation chamber is directed through the array of secondary filters downstream of the centrifugal separation chamber. The secondary filters remove impurities of a predetermined type.

The secondary filters may consist of filters of a single type or more than one type. For example, the secondary filters may be selected from filters for removing particulate material of a predetermined size range, filters for removing particular metals or ions from the fluid stream, filters for removing dissolved gases (e.g. chlorine) and/or organic impurities, and combinations thereof.

The secondary filters may comprise a filter for removing particles of a single size range or may comprise several filters (e.g. two) for removing particles of different size ranges. For example, a first filter may remove particles of 5 microns or greater, and a second filter downstream of the first filter may remove particles of 1 micron or greater.

Filters for removing metals (e.g. heavy metals) or ions from the fluid stream can comprise ion-exchange resins. Such ion exchange resins are well known.

Filters for removing organic impurities and chlorine can comprise activated carbon or activated charcoal. Again, such materials are well known and widely available.

In one embodiment, each liquid flow path through the secondary filters may comprise a first filter for filtering particles of one size range and one or more further filters for filtering particles of progressively smaller sizes and/or removing other impurities from the fluid. In a specific embodiment of the invention, the secondary filters may comprise, in sequence, a first filter for removing particles of one size range (e.g. down to 5 microns in size), a second filter for removing particles of a smaller size range (e.g. down to 1 micron in size, and a third filter which contains a filtration substance for removing organic chemical impurities and chlorine from the liquid stream.

The array (b-ii) of tertiary filters downstream of the secondary filters, when present, is arranged to remove impurities not removed by the centrifugal separation chamber and secondary filters.

The tertiary filters can be, for example, reverse osmosis membrane filters. Such filters can remove dissolved salts such as sodium chloride and are therefore particularly useful in desalinating liquid streams.

The flow splitting chamber diverts a proportion of the fluid to a plurality of nozzles which are oriented at an angle with respect to the longitudinal axis such that a pressure of fluid ejected through the nozzles provides a driving force to rotate the filtration unit. Thus, the motive power for driving rotation of the filtration unit comprises or consists mainly of the pressure of the fluid being purified. The flow splitting chamber is typically downstream of the centrifugal separation chamber. It may, for example, be located downstream of the array of secondary filters. Where an array of tertiary filters is present, the flow splitting chamber is preferably located upstream of the array of tertiary filters.

Fluid passing out of the nozzles may be collected by a cowling which is fixed with respect to the rotatable filtration unit. The cowling may be connected to waste, or may be connected to the apparatus so as to recycle at least a proportion of the fluid from the nozzles. For example, when the flow splitting chamber is located downstream of the array of secondary filters, the partially purified fluid emerging from the nozzles may be recycled and mixed with unpurified fluid in or before entering the apparatus.

The cowling is fixed and typically does not rotate with the filtration unit. One or more moving seals may therefore be provided between the filtration unit and the cowling to prevent or reduce loss of fluid through leakage.

Where an array of tertiary filters (b-ii) is present, the array may be arranged radially outwardly of the array of secondary filters (b-i) so that there are concentric arrays of secondary and tertiary filters. The arrays of secondary and tertiary filters may be arranged so that the centrifugal force created by the rotation of the filtration unit assists in driving the fluid through the tertiary filters.

The filtration unit may comprise concentric inner and outer drums. The array of secondary filters may be disposed within an inner drum and the array of tertiary filters may be disposed within an outer drum and radially outwardly of the inner drum. The inner drum may have a shorter axial length than the outer drum and may be contained wholly within the outer drum. The outer and inner drums may be configured so that the centrifugal separation chamber is adjacent an upstream end of the inner drum and the flow splitter chamber is adjacent a downstream end of the inner drum.

The filtration unit may comprise a plurality of radially extending discs mounted on the longitudinal tube so as to be rotatable therewith, at least two of the discs being of a larger diameter and constituting end walls for the outer drum. The larger discs may also constitute one or both of the end walls of the inner drum. It is preferred however that one of the end walls of the inner drum is constituted by a disc of smaller diameter. One or more further discs of smaller diameter may be used to divide the interior of the inner drum into separate chambers, each of which may contain an array of secondary filters. Fluid communication between the chambers is provided by openings in the discs.

The radially outer surfaces of the inner and outer drums are typically constituted by tubes or tube-like structures which span and are connected to the discs.

In one embodiment, the filtration unit comprises three larger diameter discs and at least one smaller diameter disc, wherein the centrifugal separation chamber is disposed between first and second of the larger diameter discs; the inner drum, array of tertiary filters and the flow splitter chamber are disposed between the second and third of the larger diameter discs; the array of tertiary filters is disposed radially outwardly of the inner drum and is concentric therewith; and the flow splitter chamber is adjacent an axial end wall of the inner drum constituted by the said at least one smaller diameter disc.

In this embodiment, one axial end wall of the inner drum is constituted by a smaller diameter disc. The other axial end wall may be constituted by the second larger diameter disc. The inner drum may contain one or more (e.g. two) further smaller diameter discs which serve to divide the interior of the inner drum into separate chambers, each of which may contain a different array of filters.

A disc of intermediate diameter may be present in the centrifugal separation chamber. The intermediate diameter disc may function as a baffle to prevent fluid from passing directly into the array of secondary filters. The baffle assists in the movement of particulate materials to the outer wall of the centrifugal separation chamber.

Each array of filters typically consists of a plurality of filters arranged in a circular array about the longitudinal axis. For example, the array of secondary filters may consist of 4, 5, 6, 7 or 8 (more preferably 6) filtering elements arranged in a circular array centred on the longitudinal axis. The array of tertiary filters may consist of 2, 3, 4, 5, 6, 7 or 8 filters arranged in a circular array centred on the longitudinal axis. In one embodiment, there are 6 secondary filters and 3 tertiary filters.

The central longitudinal tube is rotatably mounted on the support structure. The support structure is typically provided with two or more sets of bearings within which the tube is rotatably supported. Fluid may be introduced into the tube through a first set of lateral openings in the tube wall which communicate with a manifold mounted about the tube. The manifold is provided with a rotatable seal which engages the tube so as to prevent or minimise loss of fluid. Fluid passes from the tube interior into the centrifugal separation chamber through a second set of lateral openings in the tube wall. To prevent fluid loss through the ends of the tube, the longitudinal tube may either be closed at the ends thereof or blocking elements may be disposed at appropriate locations within the bore of the tube.

The apparatus of the invention may be used to filter a variety of different fluids and in particular liquids in order to remove particulate materials and other impurities.

In one particular embodiment, the apparatus of the invention is set up to purify water. The pressurised source of liquid is therefore a pressurised source of water. The water can be, for example, water taken from a bore hole, well, river, stream, pond, lake or body of salt water, or from a waste water container, and the pressure is supplied by means of a pump which is used to pump the water to and through the apparatus. Thus, the water pressure created by the pump provides the primary means of power for rotating the filtration unit. A motor may be used as an ancillary power source to increase the speed of rotation where the water pressure alone is insufficient to rotate the filtration unit at the desired speed. A motor may also be used to initiate rotation of the filtration unit in order to create an initial centrifugal force to separate out particulate matter. Once the centrifugal force has reached a level sufficient to prevent particulate matter from contaminating the secondary filters, the motor may then be turned off. In one preferred embodiment, the apparatus of the invention may be used for producing purified desalinated water from contaminated salt water.

The pump and any ancillary motors may be powered by mains electricity, or by means of a portable generator, or by any of a range of renewable energy sources such as solar power.

The apparatus of the invention may also be used to filter other liquids such as hydrocarbons.

The apparatus of the invention can be constructed so as to be portable, for example on a truck or lorry, and can therefore be transported quickly and easily to locations where it is needed, for example in disaster relief operations where there is a shortage or absence of clean water.

In a further aspect, the invention provides a method of separating materials suspended in a fluid stream, which method comprises passing the fluid stream through an apparatus as defined herein.

In one particular embodiment, the method is used to remove particulate materials and optionally other impurities from water, for example to provide potable water.

In another embodiment, the method is used to separate oil and water. This embodiment of the invention is envisaged as being particularly useful in cleaning up operations following an oil spill. Thus, for example, the apparatus can be mounted on a boat or other floating support and sea water pumped through the apparatus. Oil removed from the seawater can be stored in a container for disposal or recycling and the water returned to the sea, or passed through one or more further filters or separation devices to remove any remaining traces of oil.

The invention will now be illustrated in more detail (but not limited) by reference to the specific embodiment shown in the accompanying drawings, which is an apparatus for the purification of water.

DETAILED DESCRIPTION OF THE INVENTION

Figure 1:
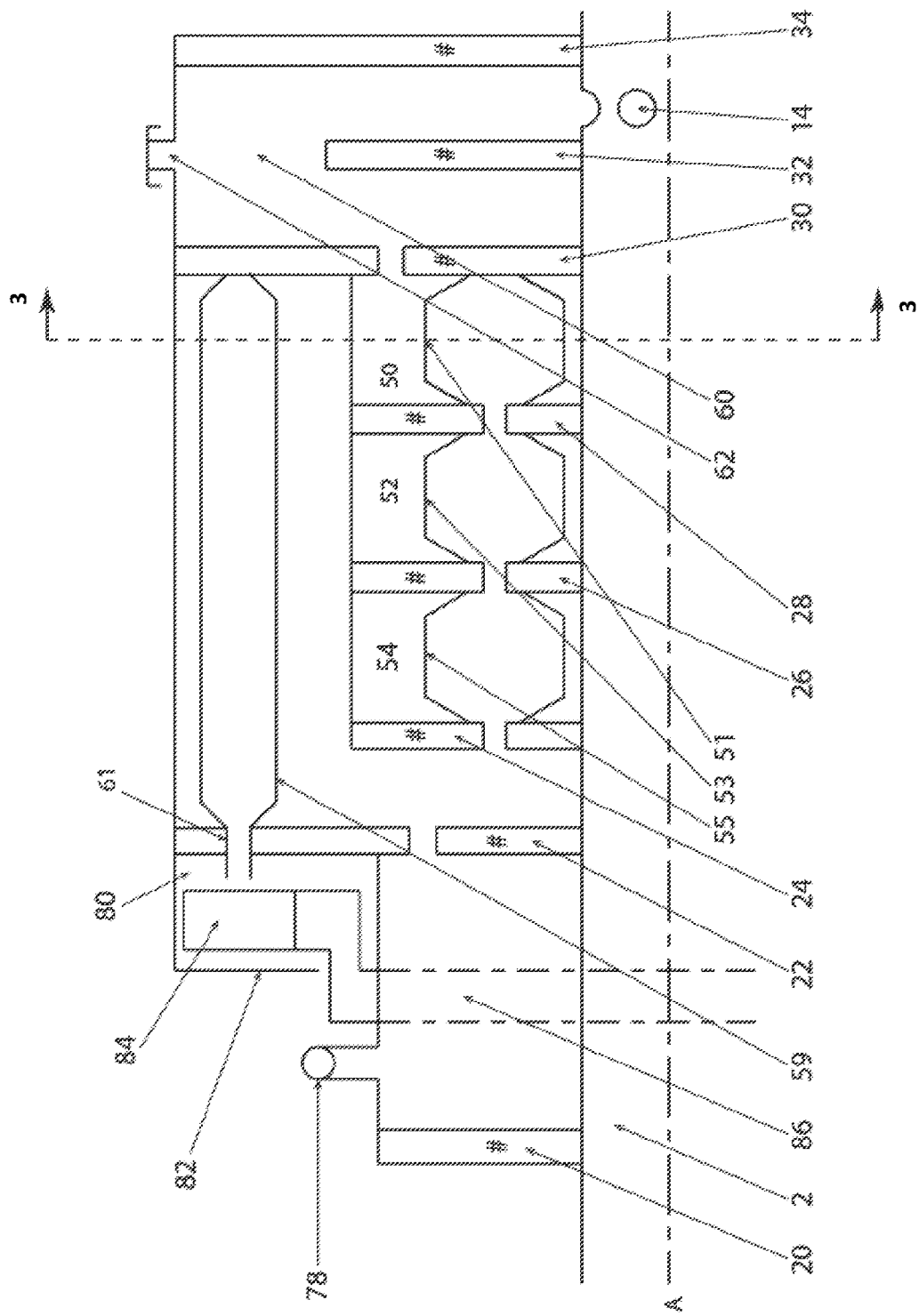
FIG. 1 is a partial side sectional schematic view through an apparatus according to a first embodiment of the invention.
Figure 2:
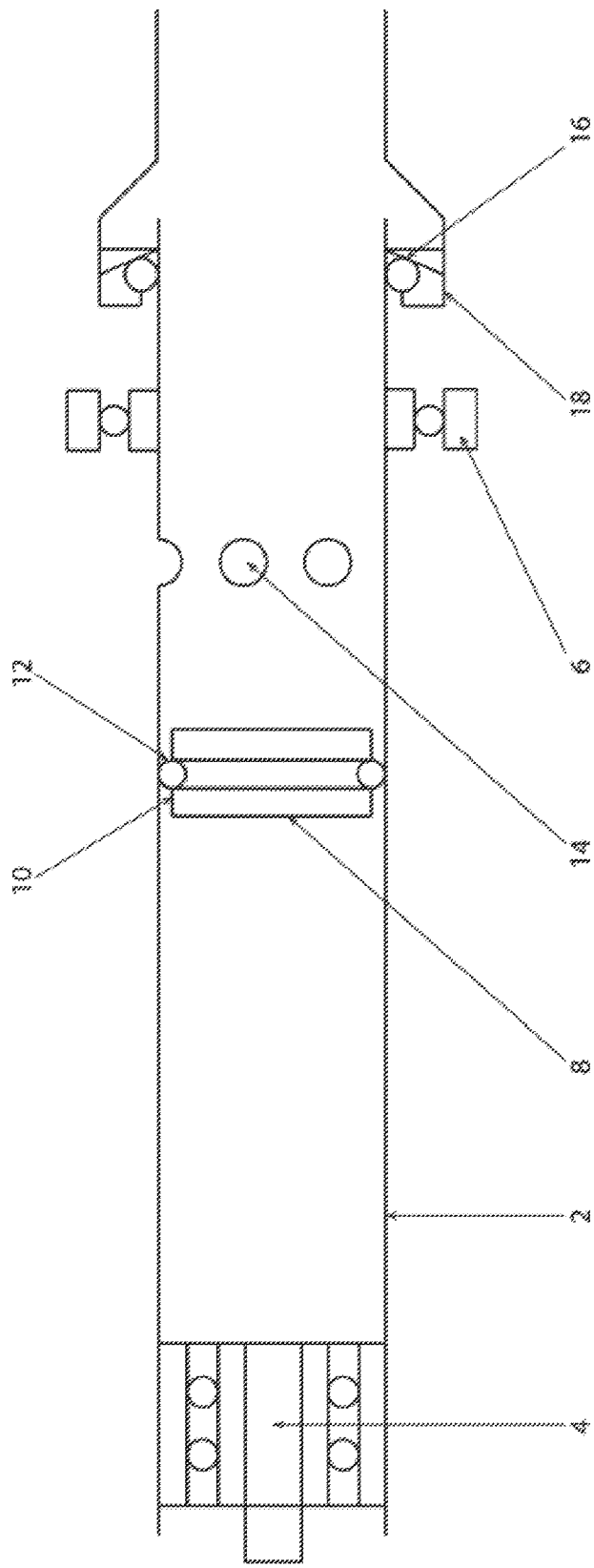
FIG. 2 is a side sectional schematic view showing a central tube of the apparatus of FIG. 1.
Figure 3:
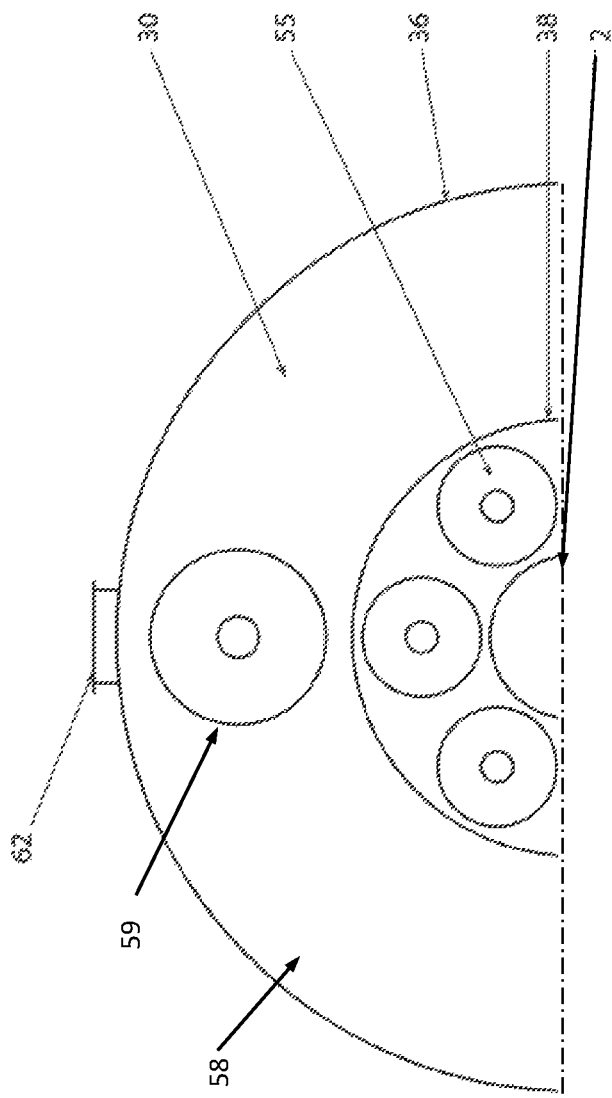
FIG. 3 is a sectional view along line I-I in FIG. 1.

Referring now to the drawings FIGS. 1 to 8, in one embodiment, the apparatus comprises a longitudinal tube 2 formed from stainless steel or another suitably environmentally resistant material. The tube 2 is rotatably mounted on a support structure 3 (see FIG. 8) by means of a spigot and thrust bearing assembly 4 secured within one end of the tube 2 and an externally mounted support bearing 6. The interior of the tube is blocked by a sealing member 8 which comprises a closed-ended tubular element 10 and an O-ring seal 12 seated in a circumferential groove in the outer surface of the tubular element 10. To one side of the sealing member 8, the tube 2 is provided with a circumferential array of regularly spaced holes. Upstream of the holes 14, a rotatable seal assembly 16 is mounted about the tube. The rotatable seal assembly forms part of a liquid inlet manifold 18 which is connected to a supply of liquid via a pump (not shown).

Fixed to the outer surface of the tube 2 and extending outwardly therefrom are discs 20, 22, 24, 26, 28, 30, 32 and 34 which can be formed from a suitably tough plastics material or a corrosion resistant metal. In FIG. 1, the larger diameter discs 22 and 30 are formed from a transparent plastics material but they may also be formed from non-transparent plastics materials and metals such as stainless steel.

An outer cylindrical member 36 is fixed to the three largest diameter discs 22, 30 and 34 to form an outer drum. The three smaller diameter discs 24, 26 and 28 and the larger diameter disc 30 are fixed to an inner cylindrical member 38 to form an inner drum. As will be appreciated, the inner and outer drums are arranged concentrically about the tube 2. The inner and outer drums rotate with the tube 2.

The discs 22, 24, 26, 28 and 30 each have a circumferential array of holes 40, 42, 44, 46, 48 (only one hole of each array being shown in the drawings). The combination of discs, cylindrical members and holes serves to divide the interiors of the inner and outer drums up into a series of interconnected chambers.

The interior of the inner drum is divided into three linked chambers 50, 52, 54 (see FIG. 4), each of which contains an annular array of secondary filtering elements. In the embodiment shown, the chamber 50 contains an array of 5 micron particle filters 51, the chamber 52 contains an array of 1 micron particle filters 53 and chamber 54 contains an array of activated charcoal filters 55.

Part of the interior of the outer drum is taken up by the inner drum. The remainder of the interior of the outer drum is divided into a flow separator chamber 56, an outer filtration chamber 58, a centrifugal separation chamber 60 and a collection chamber 80. The outer filtration chamber 58 is an annular chamber 58 which contains an annular array of tertiary filters 59 which in this embodiment are reverse osmosis filters. The tertiary filters 59 have outlets which extend through openings in the disc 22 into the collection chamber 80.

Figure 4:
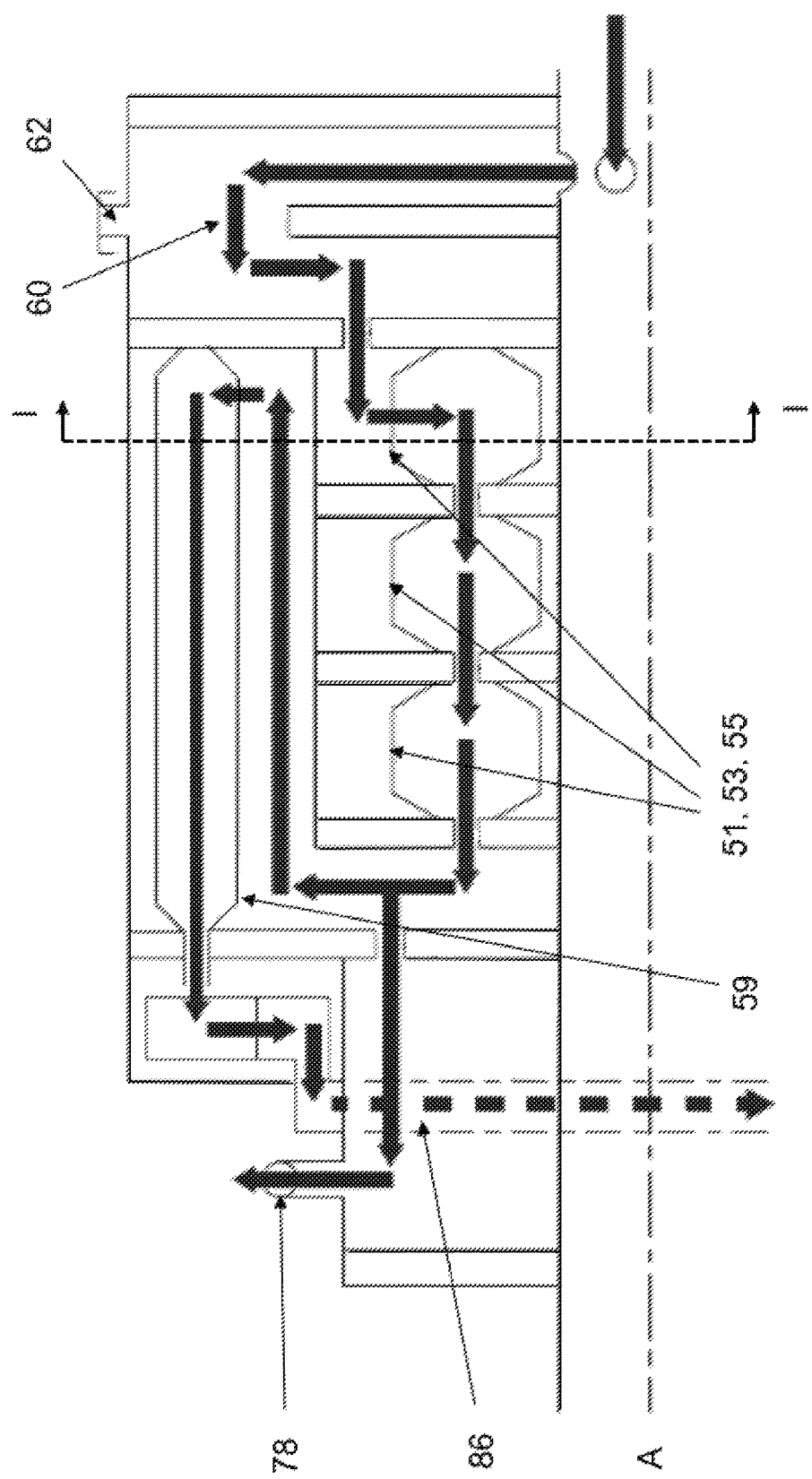
FIG. 4 is a partial side sectional schematic view corresponding to FIG. 1 but showing the direction of flow of fluid through the apparatus

The arrangement of the filters inside the inner and outer drums is shown in FIG. 4. In this embodiment, six sets of secondary filtering elements and three reverse osmosis filters are used although it will be appreciated that larger or smaller numbers of secondary and tertiary filters can be used if required.

The centrifugal separation chamber 60 is divided in two by disc 32 which functions as a sludge barrier preventing large particles from passing through hole 48 into the coarse filtration chamber 50. The radially outer part of the centrifugal separation chamber 60 forms a sludge trap which collects larger particles entering the chamber. A sludge flushing port 62 is provided in the outer wall of the outer drum to allow sludge to be removed from the sludge trap. The centrifugal separation chamber communicates with the interior of the tube 2 through the openings 14 in the tube.

Figure 6:
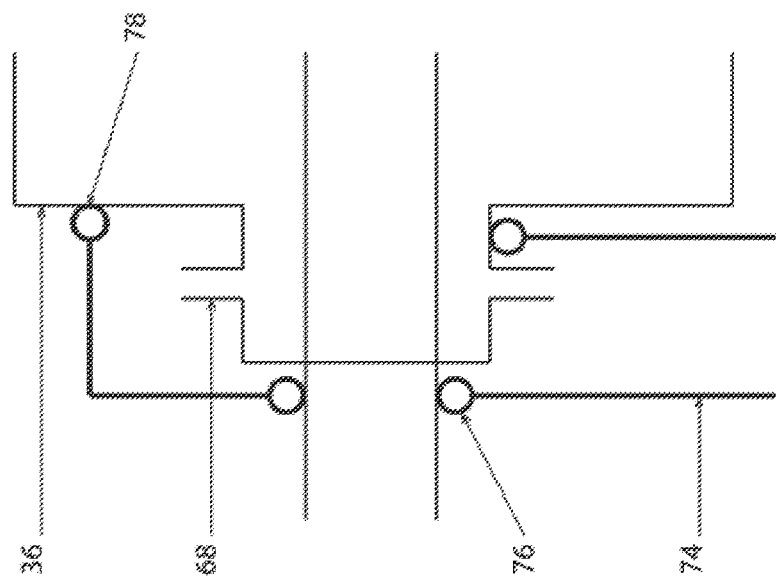
FIG. 6 is a schematic partial side sectional view showing the cowling of FIG. 5.
Figure 5:
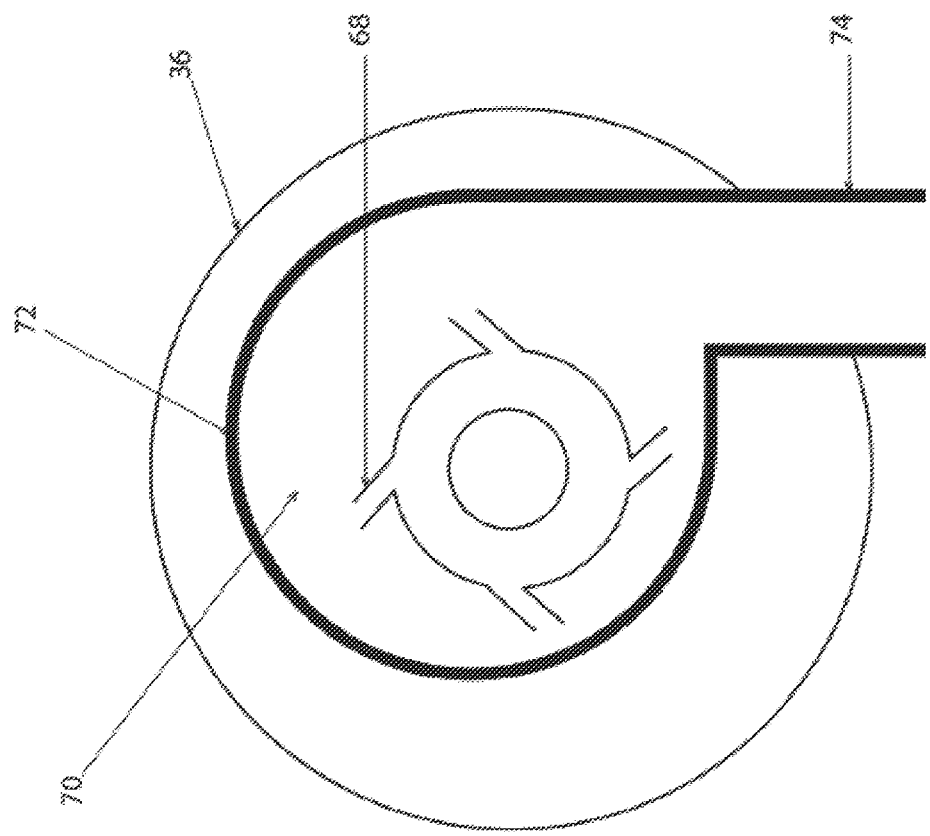
FIG. 5 is a schematic partial end view showing a cowling attached to the apparatus of FIGS. 1 to 3.
Figure 7:
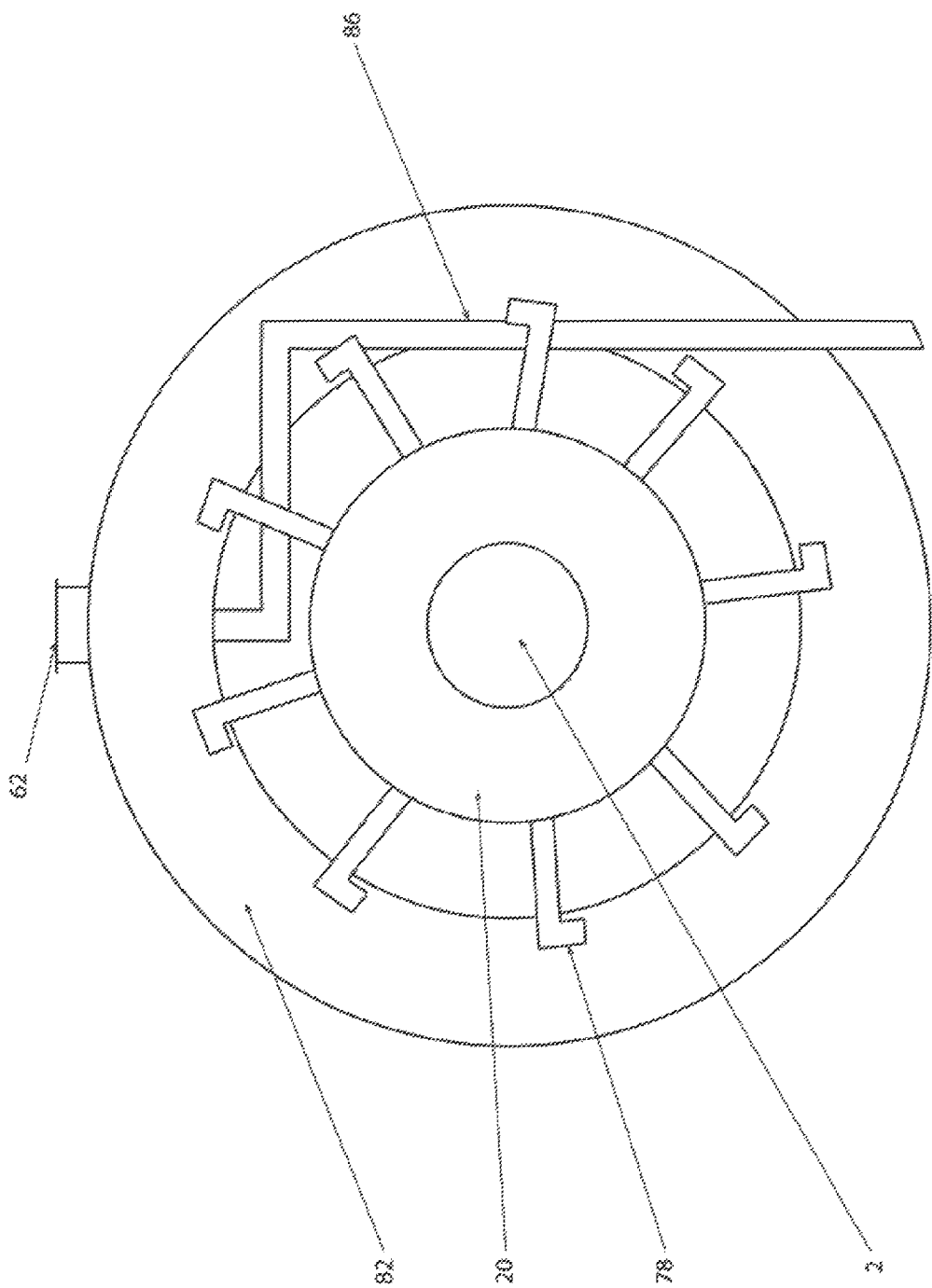
FIG. 7 is a schematic end view of the apparatus of FIGS. 1 to 6, but with the cowling of FIGS. 5 and 6 omitted.
Figure 8:
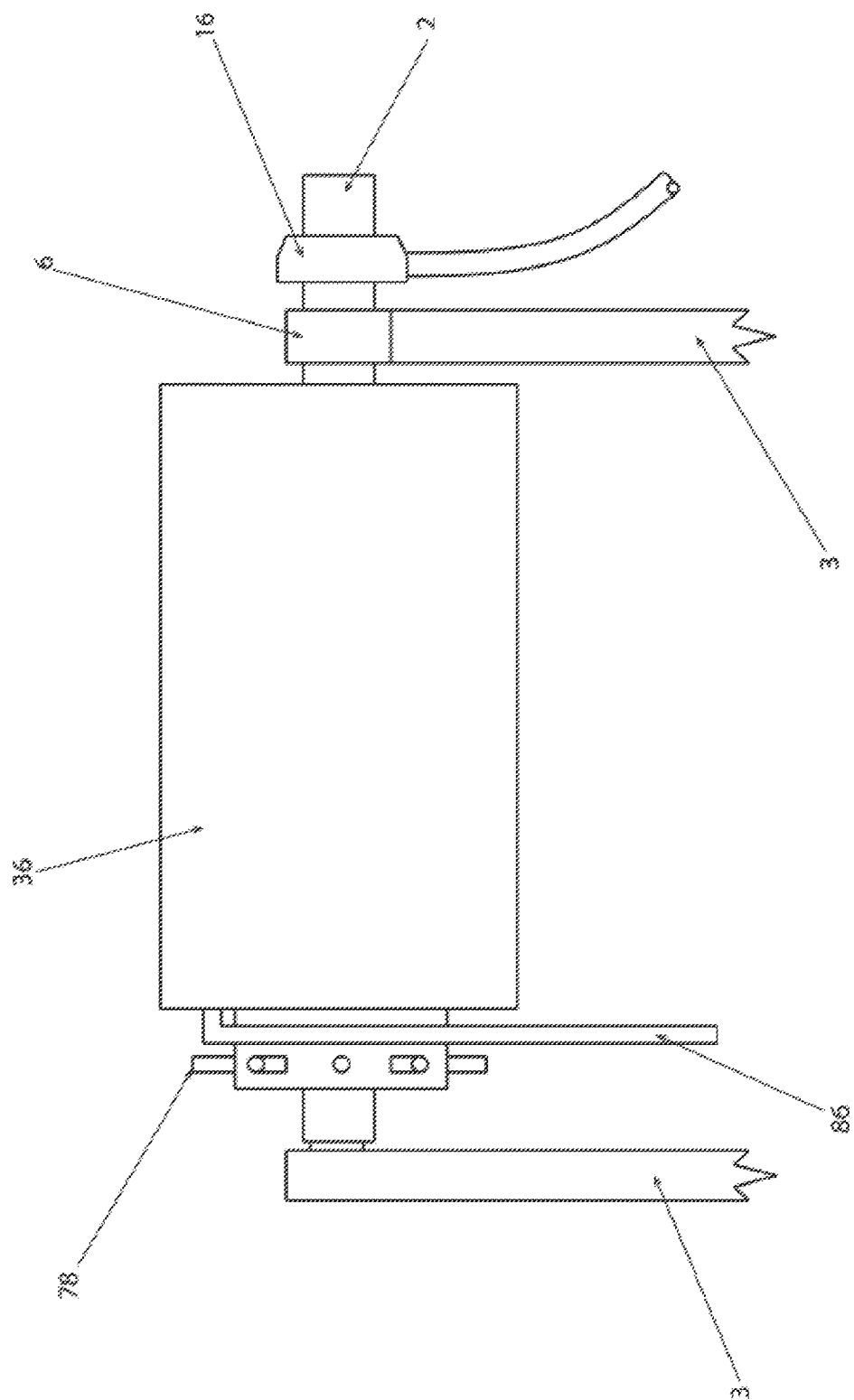
FIG. 8 is a schematic side view of the apparatus of FIGS. 1 to 6 but with the cowling of FIGS. 5 and 6 omitted.
Figure 9:
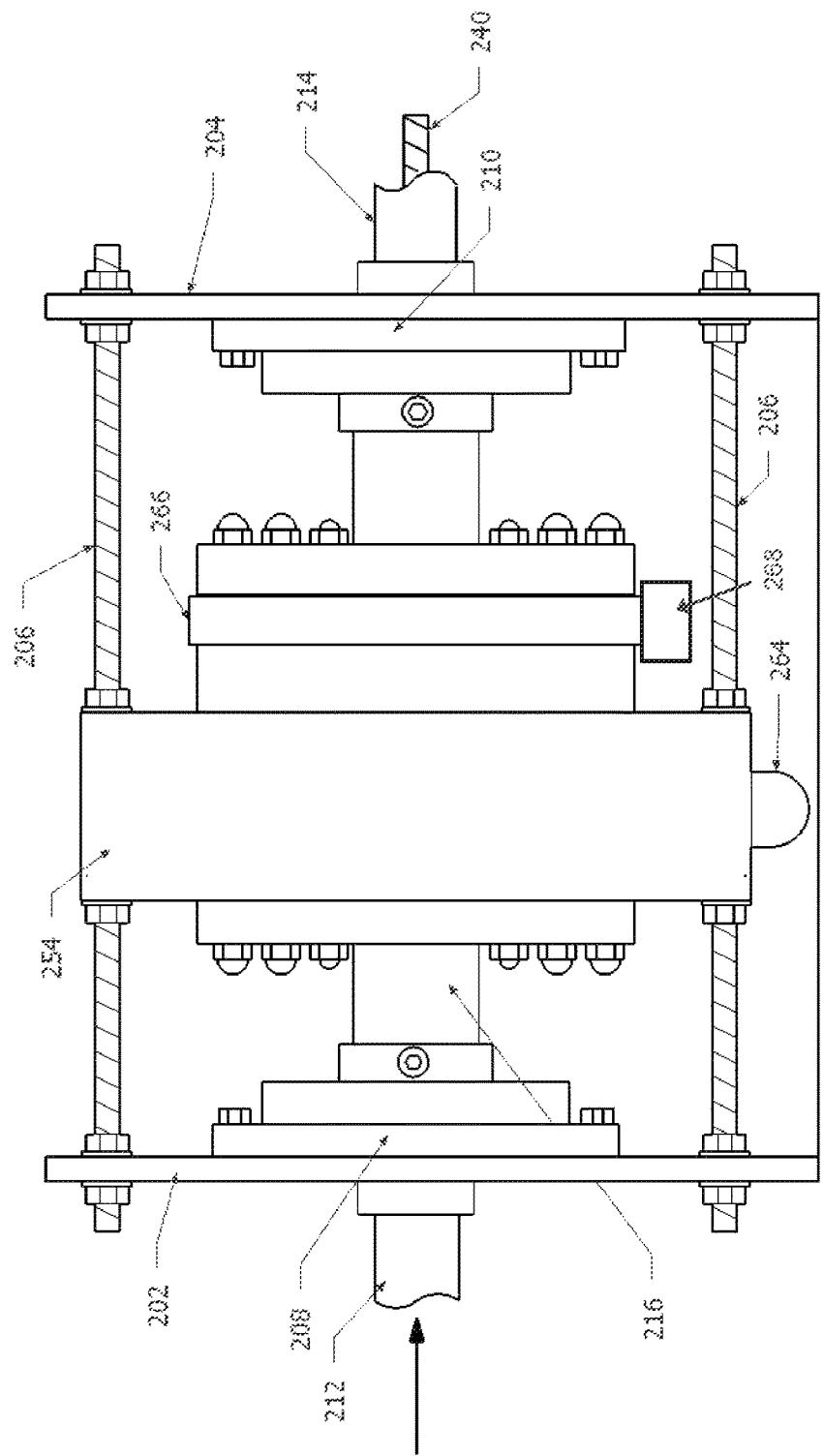
FIG. 9 is a schematic side view of an apparatus according to a second embodiment of the invention.
Figure 10:
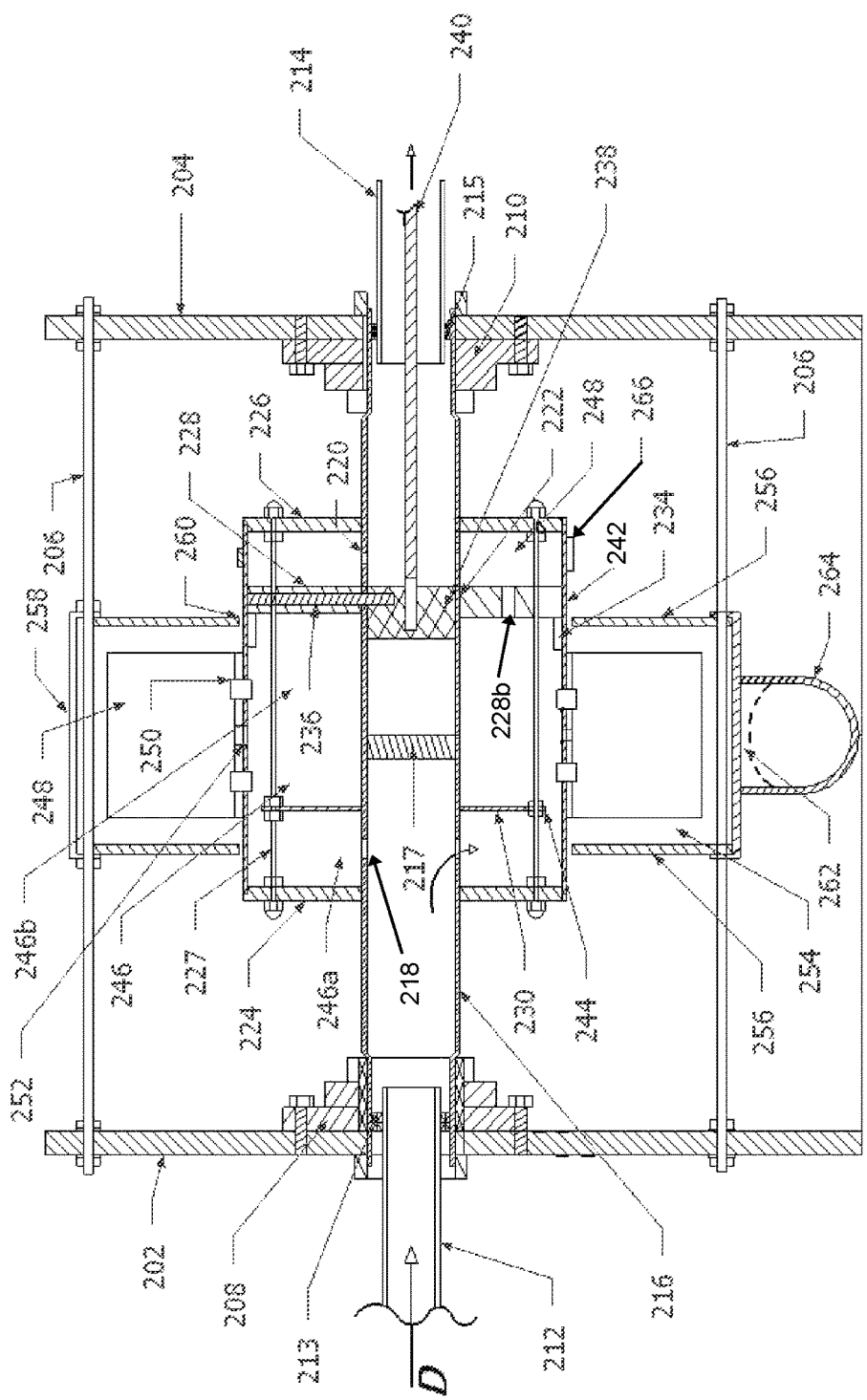
FIG. 10 is a side sectional view through the apparatus of FIG. 9.
Figure 11:
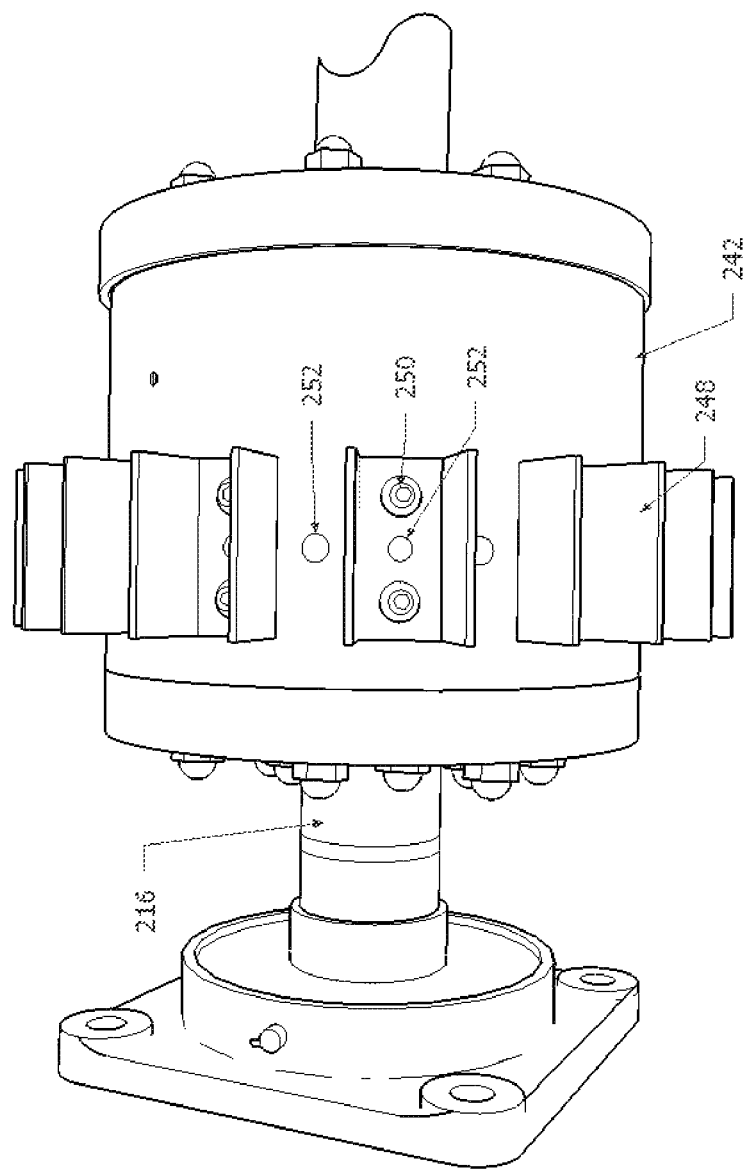
FIG. 11 is a perspective view from one side of the rotating drum assembly of the apparatus of FIGS. 9 and 10 but with the collector device removed and only one of the bearings shown.
Figure 12:
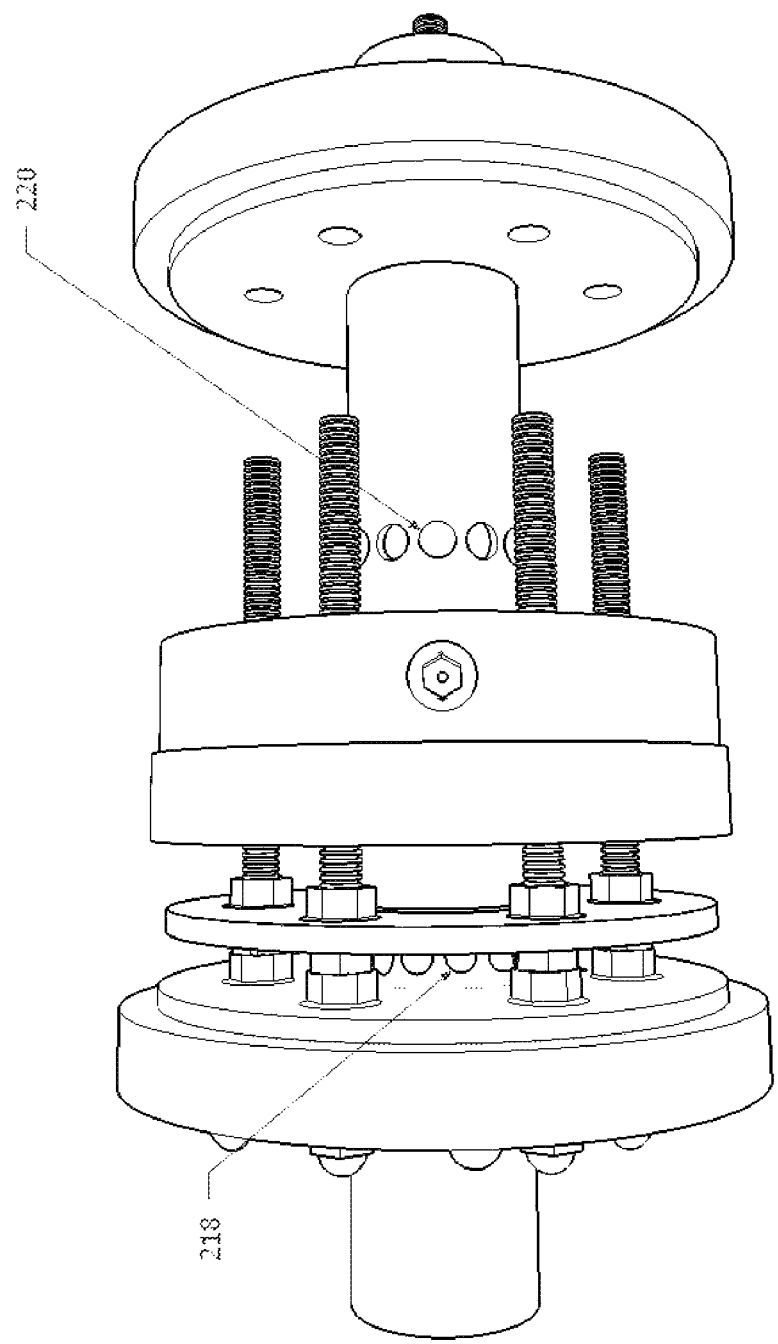
FIG. 12 is a view of the inner components of the rotating drum assembly of FIG. 11.
Figure 13:
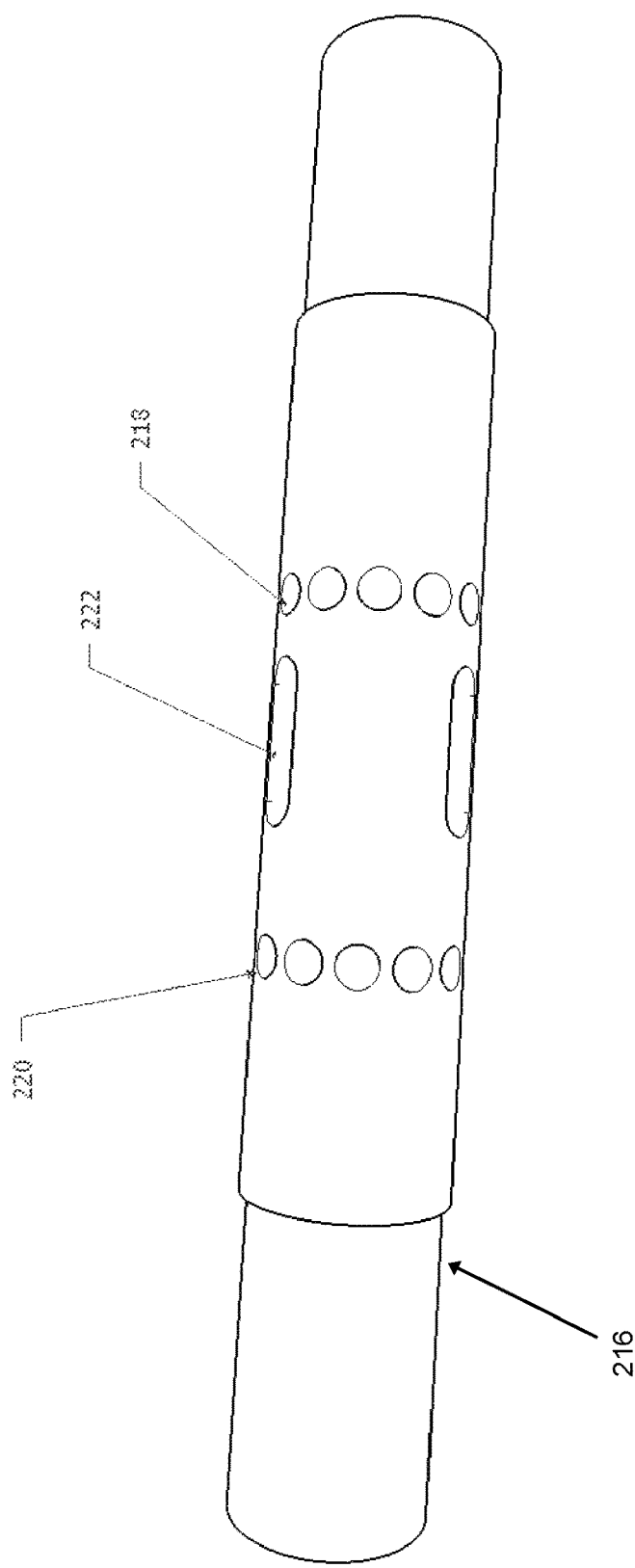
FIG. 13 is a perspective view of the central tube of the apparatus of FIGS. 9 to 12.
Figure 14:
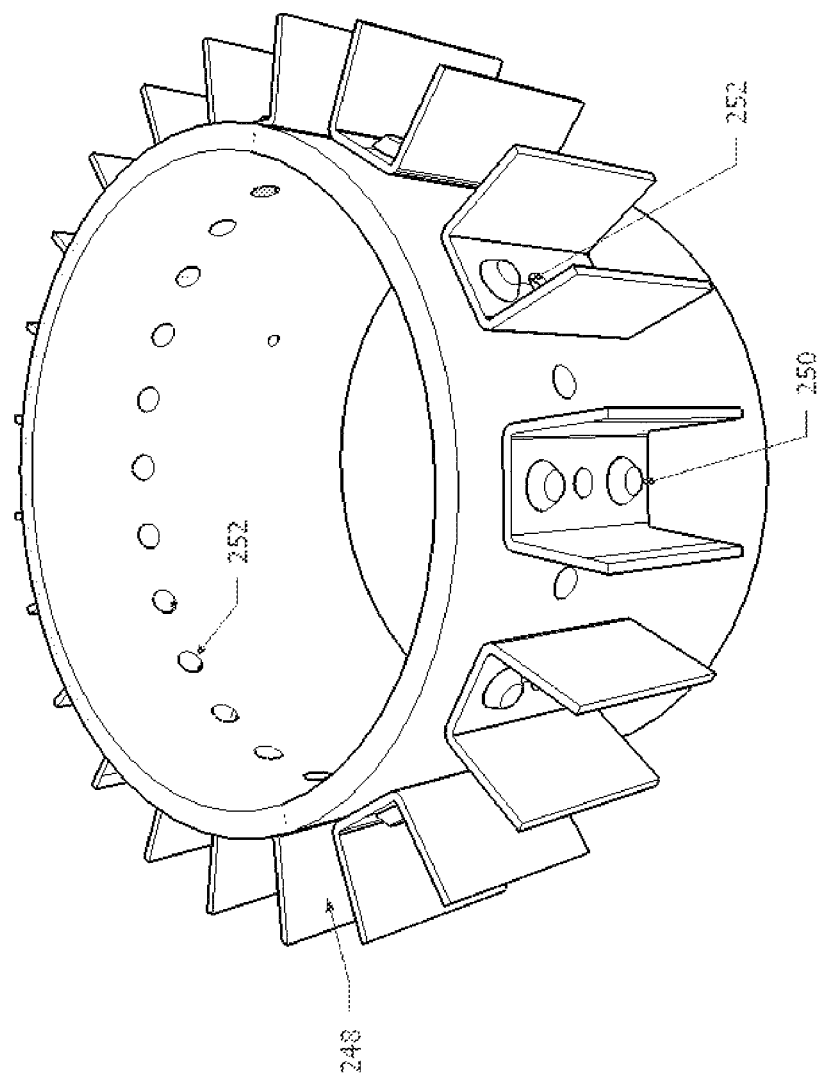
FIG. 14 is a perspective view of the drum forming part of the rotating drum assembly of FIG. 11 with the vanes visible.
Figure 15:
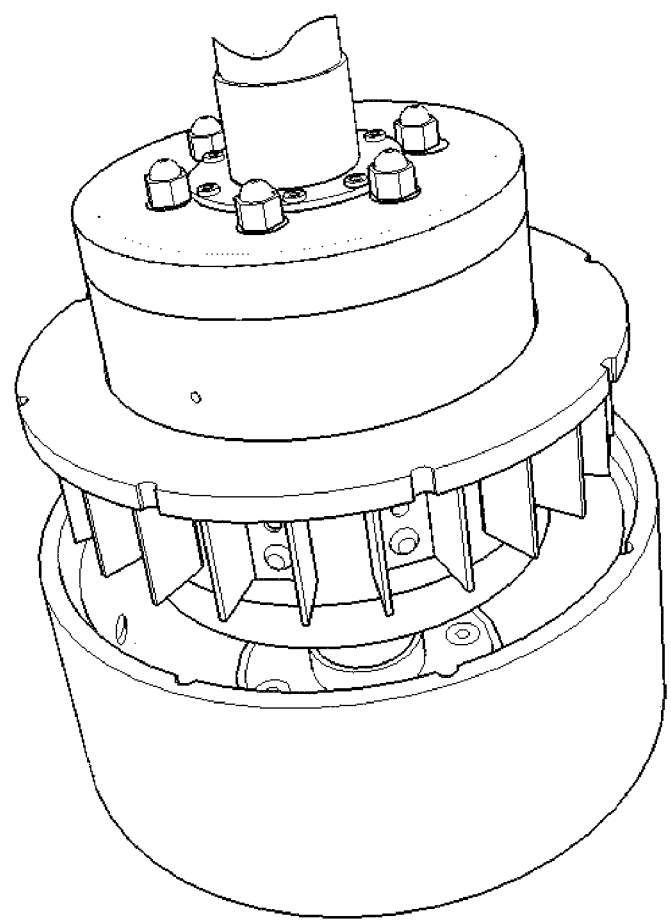
FIG. 15 is a perspective view of the apparatus of FIGS. 9 and 10, partially dismantled to show the collector device surrounding the rotating drum assembly.

The flow separator chamber 56 opens out into the outer filtration chamber 58 but also communicates via openings 40 with the turbine chamber 66. The turbine chamber 66 is provided with an array of angled vents or nozzles 68 which open at an angle transverse with respect to the axis of the tube 2. In FIGS. 5 and 6, only four angled vents are shown, but it will be appreciated that more vents may be employed if desired, as shown in FIGS. 7 and 8. The vents or nozzles 68 open into a cowling 70 which is mounted about the tube 2 (see FIGS. 5 and 6). The cowling 70 is fixed and does not rotate with the tube. Instead, the tube rotates within the cowling. The cowling 70 comprises a casing 72 and an outlet tune 74. Sealing elements 74 and 76 provide a moving seal between the cowling and the tube 2 and the cowling and the end wall of the outer drum (the disc 22) respectively. The cowling is omitted for clarity in FIGS. 7 and 8.

The collection chamber 80 is formed by the outer cylindrical member 36 and a radially inwardly oriented end wall 82 connected to (or integrally formed with) the outer cylindrical member 36. Inside the collection chamber 80 is a scoop-like structure 84 which is connected to a tube 86. The scoop-like structure and tube 86 have a fixed position and do not rotate with the outer and inner drums. The tube 86 extends through an annular gap between the radially inner edge of the end wall 82 and the outer surface of the turbine chamber and out through a hole in the cowling (not shown in FIGS. 7 and 8) to a water receptacle or container (not shown).

The apparatus shown in FIGS. 1 to 8 can be used to purify water, for example water taken from a river or well. When used for this purpose, untreated water is pumped into the tube 2 and passes through the openings 14 into the centrifugal separation chamber 60. Once in the centrifugal separation chamber, the water is diverted around the edge of disc 52 and into the downstream part of the inlet chamber. The rotation of the inner and outer drums and tube 2 creates a centrifugal force that causes large particles suspended in the water to settle as a sludge in the radially outer part of the chamber. The sludge can be removed at intervals through the sludge flushing port 62.

After removal of large suspended particulate matter in the sludge trap, the stream of water passes through opening 48 and into the first secondary filter 51 which, in this embodiment, is a 5 micron sediment filter. Water exiting the 5 micron filter 51 then passes through opening 46 and into the second secondary filter 53, which is of a finer grade than filter 51 and removes particles of a size down to 1 micron. The water stream then passes through opening 44 into the third secondary filter which is an activated carbon filter for removing organic pollutants from the water.

After leaving the third secondary filter 53, the water passes through opening 42 in disc 29 and into the a flow separator chamber 56. Here the stream of water is split, part of the water flowing through the opening 40 into the turbine chamber 66 and the remainder passing into the outer filtration chamber 58. In the outer filtration chamber 58, the partially purified water passes through a tertiary filter 59 which in this embodiment is a reverse osmosis filter, for example an Amfor™ reverse osmosis membrane filter available from Amfor Inc., of Newport Beach, Calif. The filter 59 removes substantially all of the remaining impurities from the water to give potable water which passes through opening 61 to the collection chamber 80. As the drums rotate, water emerging into the collection chamber 80 is collected by the fixed scoop-like member and conveyed to a suitable storage chamber.

The water passing into the turbine chamber 66 is directed out through the angled vents 78, the pressure of the water emerging from the openings providing a rotational force which rotates the tube and inner/outer drum assembly. The partially purified water passing through the turbine chamber and into the cowling 70 can be passed to waste or can be collected, mixed with water from the source and recycled through the apparatus.

It will be appreciated that the water pressure within the apparatus will determine the speed of rotation of the tube and associated inner and outer drums. The greater the speed of rotation, the larger the centrifugal force acting on the water and any sediment suspended in the water. Coarse sediment present in water entering the inlet chamber from the pipe moves to the outer edges of the inlet chamber under the centrifugal force. With larger centrifugal forces, a greater proportion of sediment can be removed from the water in the inlet chamber thereby preventing it from passing into and clogging the first primary filter 51. Although the main motive power for rotation of the apparatus is the pump, a motor (not shown) may be used to supplement the pump where water pressure is low. The motor may also be used to start rotation of the tube and drums before water is admitted into the apparatus thereby ensuring that the water and any entrained particles are subjected to a centrifugal force as soon as the water passes into the water inlet chamber. This prevents coarse sediment from entering the primary filters on start-up of the apparatus. Once the water passing through the turbine chamber is of a sufficient pressure to drive the rotation of the tube, the motor can be switched off.

In the embodiment shown in the drawings, the collection chamber 80 is located at the same end of the filtration drum as the turbine chamber. The size and angle of the vents 78 and the dimensions of the end wall 82 of the collection chamber 80 are selected so as to prevent or minimise the possibility of partially purified water from the vents 78 entering the collection chamber.

In an alternative embodiment (not shown), the collection chamber is located at the opposite end of the apparatus. In this alternative embodiment, the "left hand" end (with reference to the orientations shown in the drawings) of the reverse osmosis filter 59 is provided with an opening for receiving water from the flow separator chamber 56 and the outlet of the filter is at the "right hand end" of the filter. The discs 30 and 34 are provided with aligned openings which are connected by a length of tubing and the collection chamber is located on the "right hand side" of the disc 34 and is a mirror image of the collection chamber shown in FIG. 1. In this embodiment, water from the flow separator chamber 56 passes into the reverse osmosis filter 59, along the filter and out through the opening in the disc 30 via the length of tubing and through the opening in disc 34 and into the collection chamber. An advantage of having the water collection chamber at the opposite end of the filtration device from the turbine chamber is that there is even less chance of purified water being contaminated by partially purified water from the turbine chamber vents.

The embodiment of the invention illustrated in FIGS. 1 to 8 has been described by particular reference to the purification of water but it can also be used for purifying other liquids by the removal of particulate matter.

An apparatus according to a second embodiment of the invention is illustrated in FIGS. 9 to 15. The apparatus includes a support structure comprising a pair of end walls 202, 204 connected together by a plurality (in this case eight) of threaded rods 206 which are secured to the end walls 202, 204 by means of nuts either side of each wall. For clarity, some of the threaded rods are not shown in the drawing.

Mounted on the inwardly facing sides of the two end walls 202, 204 are bearing assemblies 208, 210. A tube 216 formed from stainless steel extends between the two bearing assemblies 208, 210, which are of conventional construction. The two ends of the tube 216 extend into the bearings and are rotatable therein. Located within the open ends of the tubes are a fluid supply pipe 212 and an outlet pipe 214. The outer surfaces of pipes 212 and 214 are sealed against the inner surfaces of the two ends of the tube 216 by means of annular sealing elements 213 and 215 respectively. The tube 216 is shown in more detail in FIG. 13 from which it can be seen that the tube has two circumferential arrays of holes 218, 220 (each array in this embodiment having ten holes) and a plurality (in this embodiment three) of elongate longitudinal slots 222 located around the circumference of the tube. The function of the holes and slots is described below.

The pipe bore is blocked by a blocking element 217 in the form of a disc having an annular sealing element set into its outer edge which forms a seal against the inner wall of the pipe. The blocking element or blank prevents fluid from passing along the pipe bore.

Fixed to the outer surface of the tube 216 and extending outwardly therefrom are a pair of disc assemblies 224, 226 which are connected together by means of threaded rods 227 (of which there are six in this embodiment) which pass through holes in the discs assemblies 224, 226 are held in place by fastening nuts either side of each disc assembly. Each disc assembly can be formed from a suitably tough plastics material or a corrosion resistant metal such as stainless steel, or a combination of plastics and metallic materials.

Disposed between the two disc assemblies 224, 226 and mounted on the tube 216 are two intermediate disc assemblies 228 and 230. Disc assembly 230 is secured to the threaded rods 208 by means of fastening nuts. Disc assembly 228 is slidably mounted on the tube 216 and has holes through which the threaded rods pass.

The intermediate disc assembly 230, in this embodiment, is formed from a suitably tough transparent plastics material, but it could alternatively be formed from a non-transparent plastics material or metal or combination thereof. The disc assembly 230 has a smaller diameter than the disc assemblies 224, 226 and 228.

Figure 16:
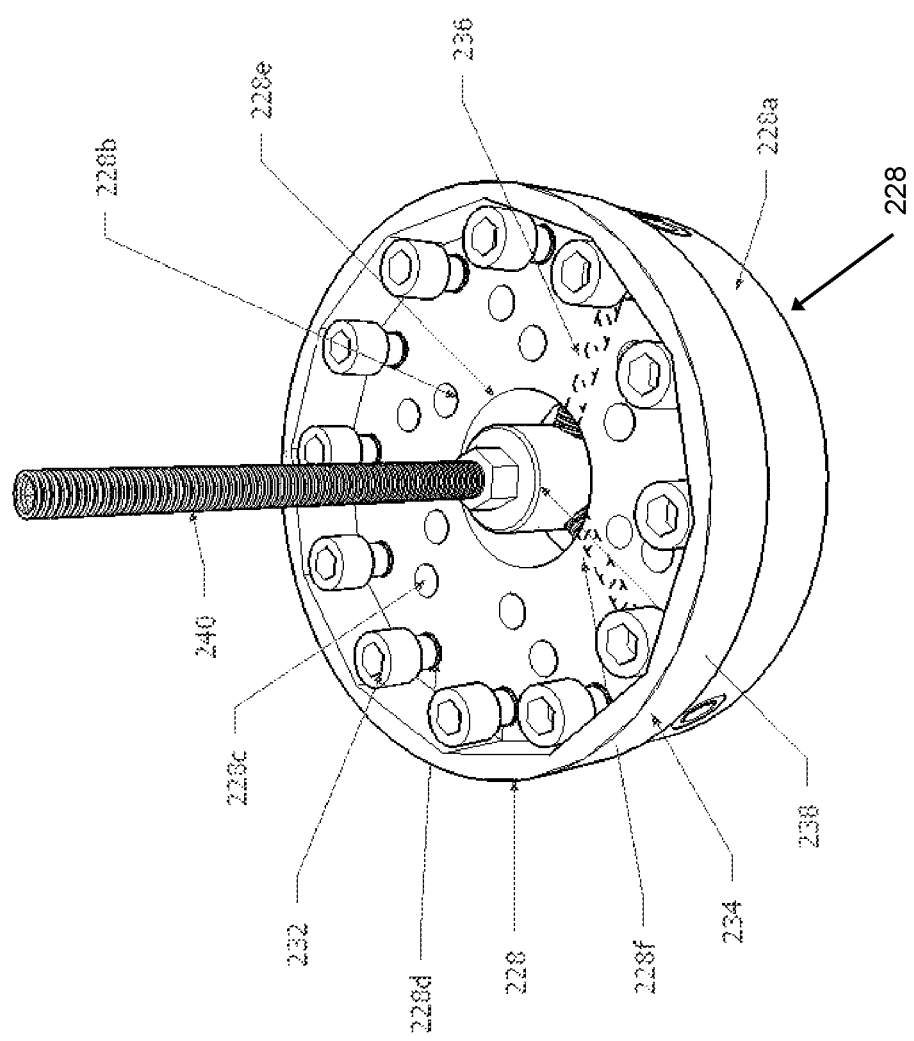
FIG. 16 is a perspective view of one of the interior walls of the rotating drum assembly of the apparatus of FIGS. 9 and 10.

The intermediate disc assembly 228, shown in more detail in FIG. 16, comprises a disc 228*a* of a transparent plastics material, although it could instead be formed from a non-transparent plastics material or a corrosion resistant metal such as stainless steel. The disc 228*a* is thicker in the longitudinal direction than the disc 230 and has three circumferential arrays of holes 228*b*, 228*c* and 228*d*, as well as a central hole 228*e*. Seated in each of the twelve outermost holes 228*d* are bolts 232. Bolts 232 serve to hold in place an annular sealing element 234 which is stretched over the bolts. The sealing element 234 is formed from a suitable elastomeric sealing material. Radially inwardly of the holes 228*d* is a circumferential array of six holes 228*c* through which the threaded rods 227 pass. Radially inwardly of the holes 228*c* are the holes 228*b* of which, in this embodiment, there are six. Holes 228*b* allow fluid communication through the disc 228*a*.

In addition to the central hole 228*e* and three circumferential arrays of holes 228*b*, 228*c* and 228*d*, the disc 228*a* has three passages 228*f* extending from the radially outer edge of the disc to the central hole 228*e*. Located within the three passages 228*f* are three fastening bolts 236. The inner ends of fastening bolts 236 extend through the slots 222 in the tube 216 and are anchored in a cylindrical sealing plug 238. The sealing plug 238 is attached to a threaded rod 240 which extends along the interior of the tube and out through a sealing gland associated with the pipe 214. The end of the rod can be attached to a tool to facilitate rotation of the rod and hence longitudinal movement of the sealing plug 238 along the tube. Thus, the rod 240 can be used to move the sealing plug and, because the disc 228 is attached to the sealing plug 238, movement of the sealing plug will also result in axial movement of the disc 228. Movement of the sealing plug 238 and disc 228 enables the effective size of the opening defined by the slots 222 to be varied, for example by increasing the opening size to facilitate the passage therethrough of more viscous materials or larger particulates.

Clamped between the disc assemblies 224 and 226 is a cylinder 242 formed from stainless steel. The cylinder 242 is shown in more detail in FIG. 14. The cylinder 242 is seated in annular recesses or rebates in the inwardly facing edges of the disc assemblies 224 and 226. The annular sealing element 234 of the intermediate disc assembly 228 sits tightly against the inner surface of the cylinder 242 whereas there is an annular gap 244 between the outer edge of the intermediate disc assembly 230 and the inner surface of the cylinder 242.

The disc assemblies 224 and 226 and the cylinder 242 together form a rotating drum assembly which rotates with the tube 216. The interior of the drum is partitioned a first chamber 246 and a second chamber 248 by the intermediate disc assembly 228. The holes 228*b* provide fluid communication between the first and second chambers.

The first chamber 246, which functions as the centrifugal separation chamber, is divided in two by the intermediate disc assembly 230. The downstream sub-chamber 246*a* receives fluid through the holes 218 in the tube 216. The upstream sub-chamber 246*b* communicates with the chamber 248 by means of the holes 228*b*. The annular gap 244 enables fluid to flow between the downstream 246a and upstream 246b sub-chambers.

Attached to the outer surface of the cylinder 242 is an array of vanes 248. In this embodiment, the vanes are longitudinally oriented but they could instead be oriented at an angle, for example, of up to 45° (e.g. from about 15° up to 40°, or from about 20° up to 37°, or from about 25° up to 35°, or from about 30° to about 32°) with respect to the longitudinal axis of the tube 216. In this embodiment, the vanes are formed in pairs, each pair being constituted by two sides of a strip of metal of channel section. The third (i.e. intermediate) side of the channel section strip is attached to the cylinder by means of rivets 250 or other fastening elements. Between each vane, there is a hole 252 proving an opening into the interior of the centrifugal separation chamber. In the embodiment shown, there are twenty four such holes although there could be more or fewer holes if desired. The function of the vanes and holes is described below.

A collector device 254, which encircles the rotating drum but does not rotate with it, is secured to the rods 206 by means of fastening nuts. The collector device 254 comprises a pair of annular elements 256 and a cylindrical element 258 which together form a circumferential channel enclosing the vanes 248 on the outer surface of the rotating drum. There is a small clearance 260 between the inner edges of the annular elements 256 and the outer surface of the rotating drum.

At its lower end (the term "lower" referring to its orientation in use), the cylindrical element has a circular or oval opening 262 which defines an outlet for the collector. The opening 262 is connected to a tube 264 for carrying away materials passing through the opening.

The rotation of the rotating drum is driven by a drive belt 266 which engages the outer surface of the drum. The drive belt is linked to a motor 268.

The apparatus shown in FIGS. 9 to 16 differs from the apparatus of FIGS. 1 to 8 in that it lacks the secondary and tertiary filtering elements present in the apparatus of FIGS. 1 to 8 and instead relies upon centrifugal force as the means by which separation is achieved. The apparatus of FIGS. 9 to 16 can be used to separate a variety of different suspended materials in a fluid stream. For example, the apparatus can be used to separate coarse particulate matter from a liquid, e.g. suspended sediment from water, or it can be used to separate oil from water.

In one particular embodiment, the apparatus can be used to separate an oil-water sludge into a predominantly water-containing component and a predominantly oil-containing component.

Thus, an oil-water sludge is pumped through the pipe 212 in direction D and thence into the tube 216 which rotates in the bearings 208 and 210 under the influence of the drive belt 266. The passage of oil-water sludge along the interior of the tube is blocked by blocking element 217 and therefore it passes into the upstream sub-chamber 246a of the centrifugal chamber 246 through the holes 218 in the wall of the tube, the movement of the sludge into the chamber being assisted by the centrifugal force imparted by the rotating tube. Inside the chamber 246a, the intermediate disc assembly 230 acts as a barrier and prevents the sludge from passing directly towards the holes 228b, forcing it instead to move radially outwardly and then through the gap 244 at the outer edge of the baffle. As it moves outwardly towards the inner surface of the cylinder 242, the centrifugal force created by the rotation of the drum causes separation of the oil and the water in the sludge. Since water is denser than oil, the water moves preferentially to the outer region of the chamber 246a and passes out though the holes 252 into the collector device 254, from where it is directed to a collection vessel (not shown). The remainder of the sludge, which by this time contains much less water and is therefore more viscous, passes into the downstream sub-chamber 246b and thence through the holes 228b and into the second chamber 248. Once in the chamber 248, the residual sludge passes through the holes 220 and the slot 222 (unless the position of the plug has been set so that the slot is blocked) and back into the interior of the tube 216. From there, the sludge passes out through the pipe 214 and is collected.

It has been found that, using the apparatus as described above, good separation of oil from water can be achieved. In order to maximise the separation of water and oil in the sludge, the speed of rotation of the drum can be varied by simple trial and error until an optimal speed is found.

It will be appreciated that as more water is removed, the residual sludge will become more viscous. Therefore, at higher speeds of rotation, where the degree of separation of oil and water will increase, the position of the plug is set so that the effective size of the openings provided by the slots 222 is increased thereby allowing the more viscous oil sludge to pass into the tube 216 more readily.

In an alternative embodiment, the apparatus can be used to separate particulate materials such as sediment, soil and sand from water. For example, the apparatus can be used to separate the waste materials resulting from fracking. At present, the liquid wastes produced by fracking are retained in settling tanks to allow sediment to settle out, a process than can be both time and space-consuming. Separation of sediments from water can be achieved much more quickly using the apparatus illustrated in FIGS. 9 to 16.

When the apparatus of FIGS. 9 to 16 is used for separating particulate materials from water, the denser particles of sediment will migrate to the outer regions of the upstream sub-chamber 246a and will pass though the holes 252 into the collector whereas substantially sediment-free water will pass through the gap 244 into the downstream sub-chamber 246b and thence through the chamber 248 and holes 220 into the tube 216 and then to a collector attached to the outlet pipe 214.

The collector device 254 does not rotate with the rotating drum but is fixed to the support structure 202, 204, 206. A moving seal could in principle be formed between the outer surface of the drum and the collector device to prevent leakage of materials through the gap between the collector device and drum but such a moving seal would need to be extremely robust in order to withstand attack by particles of sediment passing into the collector. However, it has been found that a moving seal is not required in the apparatus of FIGS. 9 to 16 because the vanes 248 on the exterior surface of the rotating drum act as impellers drawing air into the collector device and thereby preventing fluid and other materials from escaping through the gap.

The embodiments described above and illustrated in the accompanying figures and tables are merely illustrative of the invention and are not intended to have any limiting effect. It will readily be apparent that numerous modifications and alterations may be made to the specific embodiments shown without departing from the principles underlying the invention. All such modifications and alterations are intended to be embraced by this application.

The invention claimed is:

1. An apparatus for separating materials suspended in a fluid stream; the apparatus comprising:
   a support structure;
   a separator unit rotatably mounted on the support structure;

the separator unit having a longitudinal axis of rotation extending through a longitudinal tube disposed centrally within the separator unit; the longitudinal tube being connected or connectable to a pressurised source of fluid requiring separation, the longitudinal tube having one or more openings for receiving fluid under pressure from the said source and one or more lateral openings for introducing the fluid into the separator unit; wherein the separator unit comprises, in addition to the longitudinal tube:

(aa) a centrifugal separation chamber for separating suspended material from the fluid stream;

(bb) a collector for collecting either (i) suspended material separated from the fluid stream; or (ii) fluid from which at least some of the suspended material has been removed; and (cc) first and second outlets through which separated components of the fluid stream can pass, wherein suspended material separated from the fluid stream can pass out through one outlet and the fluid stream from which suspended material has been removed can pass out through the other outlet;

and wherein the separator unit comprises a first chamber and a second chamber in fluid communication with each other, the first chamber being upstream of the second chamber and functioning as the centrifugal separation chamber, wherein a radially extending inner wall, which is movable backwards and forwards in an axial direction, is provided which separates the first and second chambers; and wherein rotation of the separator unit is driven by:

(i) a motor and a mechanical linkage between the motor and the separator unit; or (ii) an array of vanes disposed on the separator unit over which or an array of nozzles disposed on the separator unit through which the fluid stream or a fluid output from the separator unit is directed to form a turbine; or (iii) a combination of the motor and mechanical linkage and the array of vanes or nozzles.

2. An apparatus according to claim 1 wherein the collector is non-rotatably attached to the support structure.

3. A method of purifying a fluid or separating suspended materials from a fluid, which method comprises passing the fluid through an apparatus as defined in claim 2, thereby purifying the fluid or separating suspended materials from the fluid.

4. An apparatus according to claim 1 wherein a fluid output from which suspended matter has been removed by the separator unit is used to power the turbine.

5. An apparatus according to claim 4 wherein the collector is non-rotatably mounted.

6. An apparatus according to claim 4 wherein the vanes are disposed within the collector so that purified or partially purified fluid passing through the collector can be used to power the turbine.

7. An apparatus according to claim 1 wherein the centrifugal separation chamber is in fluid communication with the first outlet and the second chamber is in communication with and upstream of the second outlet.

8. An apparatus according to claim 1 wherein the centrifugal separation chamber is provided with at least one baffle located adjacent the one or more lateral openings in the longitudinal tube to guide the fluid stream in a radially outward direction.

9. An apparatus according to claim 1 wherein the separator unit comprises a drum arranged about the longitudinal tube, the drum having a pair of end walls and a cylindrical outer wall, and one or more inner walls that divide the interior of the drum into the said first and second chambers and optionally one or more further chambers.

10. An apparatus according to claim 1 wherein the separator unit is configured to separate a fluid from suspended material having a lesser density than the fluid, and the collector is arranged to collect separated fluid from the centrifugal separation chamber.

11. An apparatus according to claim 10 wherein the vanes are arranged within the collector so as to form a turbine powered by the separated fluid.

12. An apparatus according to claim 1 which is configured to separate oil and water in an oil-water mixture.

13. An apparatus according to claim 1 wherein the centrifugal separation chamber separates suspended particulate matter of a first size range from the fluid stream, and wherein the separator unit further comprises:

(b-i) an array of secondary filters downstream of the centrifugal separation chamber for removing impurities of a predetermined type from the fluid stream;

(c) a flow splitting chamber for diverting a proportion of the fluid to a plurality of nozzles, the nozzles being oriented at an angle with respect to the longitudinal axis such that a pressure of fluid ejected through the nozzles provides a driving force to rotate the separator unit;

and wherein the collector collects purified fluid from the separator-unit.

14. A method of purifying a fluid or separating suspended materials from a fluid, which method comprises passing the fluid through an apparatus as defined in claim 1, thereby purifying the fluid or separating suspended materials from the fluid.

15. A method according to claim 14 wherein particulate materials and optionally other impurities are removed from water to provide potable water.

16. A method according to claim 14 wherein oil is separated from water.

17. An apparatus according to claim 1 wherein the collector is associated with either the first outlet or the second outlet.

18. An apparatus according to claim 1 wherein the first and second outlets each have their own associated collector.

* * * * *